United States Patent [19]

Lee

[11] Patent Number: 5,517,549
[45] Date of Patent: May 14, 1996

[54] CALL LOGGING IN CELLULAR SUBSCRIBER STATIONS

[75] Inventor: Jangsik Lee, Yorba Linda, Calif.

[73] Assignee: Telefonaktiebolaget L M Ericcson, Stockholm, Sweden

[21] Appl. No.: 162,639

[22] Filed: Dec. 3, 1993

[51] Int. Cl.$^6$ ..................................................... H04Q 7/20
[52] U.S. Cl. .................. 379/58; 379/63; 379/111; 379/114
[58] Field of Search .................. 379/58, 60, 59, 379/61, 62, 63, 91, 113, 130, 131, 140, 144, 56, 90, 111, 112, 114, 143; 455/33.1, 33.2, 54.1, 54.2

[56] References Cited

U.S. PATENT DOCUMENTS

| | | |
|---|---|---|
| 4,161,626 | 7/1979 | Waldo . |
| 4,640,986 | 2/1987 | Yotsutani et al. .......................... 379/63 |
| 4,656,656 | 4/1987 | Mundy, Jr. et al. . |
| 4,751,728 | 6/1988 | Treat . |
| 4,776,000 | 10/1988 | Parienti .................................... 379/144 |
| 4,813,065 | 3/1989 | Segala . |
| 4,873,719 | 10/1989 | Reese . |
| 4,924,496 | 5/1990 | Figa et al. . |
| 5,109,401 | 4/1992 | Hattori et al. ............................ 379/58 |
| 5,138,650 | 8/1992 | Stahl et al. ............................... 379/61 |
| 5,233,642 | 8/1993 | Renton ..................................... 379/59 |
| 5,303,297 | 4/1994 | Hillis ....................................... 379/63 |
| 5,325,418 | 6/1994 | McGregor et al. ...................... 379/59 |

Primary Examiner—Curtis Kuntz
Assistant Examiner—William G. Trost
Attorney, Agent, or Firm—Jenkens & Gilchrist

[57] ABSTRACT

A system for collecting within a mobile subscriber station of a cellular radio system the key elements of telephone billing information for subsequent retrieval. Information about the connected party's number, the time of the call and the duration of the call are collected in real time and stored in a non-volatile memory. Such information is selectively retrieved from the memory of the subscriber station on command and a bill for use of the subscriber station calculated on the spot (by a mobile station rental agency, for example).

14 Claims, 7 Drawing Sheets

CALL LOGGING IN CELLULAR SUBSCRIBER STATIONS

BACKGROUND OF THE INVENTION

1. Field of the Invention

The invention relates to subscriber stations for use in radio telecommunications networks and, more particularly, to a system for the logging of calls within such subscriber stations.

2. History of the Related Art

Cellular radio communications is, perhaps, the fastest growing field in the world-wide telecommunications industry. The convenience of subscriber mobility and the ability to place and receive telephone calls regardless of where the subscriber's telephone instrument is located has introduced a new era. The convenience of telecommunications without the restrictions of a physical telephone cable limiting the mobility of the telephone instrument is a great advantage. Mobile radio telecommunications may be implemented using different technologies including land mobile radio technologies, cellular radio, and personal communication systems (PCS). Hereinafter, the reference to cellular radio telecommunications systems will be intended to include each of these other telecommunication systems which employ portable subscriber stations. In such systems, the geographic range within which the subscriber station may move is determined strictly by the radio coverage area of one or more radio base stations with which the subscriber station can communicate.

The convenience of mobility of subscriber stations within the cellular radio network has facilitated new business opportunities in the field of the short term rental of portable cellular subscriber stations. Such businesses rent to a customer for the limited period of a day, a few days, a week or similar short term periods a complete portable subscriber station having cellular radio telecommunication service already established and an existing phone number and which is ready to use. Such rentals are often combined with the rental of automobiles so that mobile communications is available to a traveller using a rental car in a city away from his home.

In most cases, the rental period for which such cellular subscriber stations are rented are considerably shorter than the normal billing interval established by the operator of the cellular system. Thus, there arises a problem of knowing how to charge and what amount to charge to the renter of a cellular subscriber station since it's impossible for the rental company to know what calls to what locations and what charges have been incurred by the renter during the period of the rental contract. One way in which this is handled today is by requiring the renter to establish a credit card account with the rental company so that when the charges from the cellular system operator are received by the rental company, those charges can be debited directly against the credit card account and the detail record of the calls thereafter furnished to the credit card holder. This solution has a number of disadvantages in that the time lag between the use of the rented telephone instrument and the receipt of the charges from the cellular system operator can produce increased risks for the rental company in the form of termination of credit by the credit card company. In addition, it would be highly desirable to be able to furnish the renter of the telephone instrument a complete record of his charges at the time he returns the telephone instrument so that he can in turn process his own business expense statement and accounting records promptly after those charges are incurred.

While the accounting and billing system of the cellular radio operator maintains a complete record of all calls and charges therefor to every cellular telephone subscriber, those records must be processed in an orderly way and cannot be done on a daily or weekly basis. Thus, there exists a need for a means for monitoring and storing directly within a portable subscriber instrument, what calls have been made with the instrument, the parties called, the length of the calls and the resulting charges which have been incurred. The present invention provides such a means. The systems of the prior art do not provide telephone call charging information for a portable cellular subscriber station in a sufficiently real-time manner that the rental period of a cellular phone is virtually always shorter than the billing intervals for that cellular phone by the system operator.

SUMMARY OF THE INVENTION

In one aspect, the system of the present invention includes providing within a cellular radio subscriber station, means for collecting for later retrieval the key elements of telephone billing information such as the connected party's number, the time of the call and the duration of the call. Such information may be selectively retrieved from the subscriber station on command and a bill for the use of the station calculated on the spot.

In another aspect the present invention includes producing within a mobile subscriber station to be operated with a cellular radio system a call log to be used to collect information for charging for the use of said mobile subscriber station during a limited period of time. The beginning and end of a call to which the mobile subscriber station is a party is detected and the length of the call is calculated. A non-volatile memory located within the subscriber station stores the date and length of the call. The stored information is subsequently retrieved and used to calculate a charge for the use of the subscriber station with respect to the users participation in the call.

In a still further aspect, the present invention includes capturing the number of the other party to which the mobile subscriber station was connected during the call and storing the captured number within the non-volatile memory for subsequent retrieval. In one embodiment the number is captured by monitoring the digits of the number of a called party as they are entered into the mobile subscriber station. In another embodiment the number is captured by receiving a message on the air interface between the mobile subscriber station and a base station in which it is in communication and then extracting the digits of the calling party number from the received message.

BRIEF DESCRIPTION OF THE DRAWINGS

For a more complete understanding of the present invention and for further objects and advantages thereof, reference may now be had to the following description taken in conjunction with the accompanying drawings, in which.

DETAILED DESCRIPTION

Figure 1:
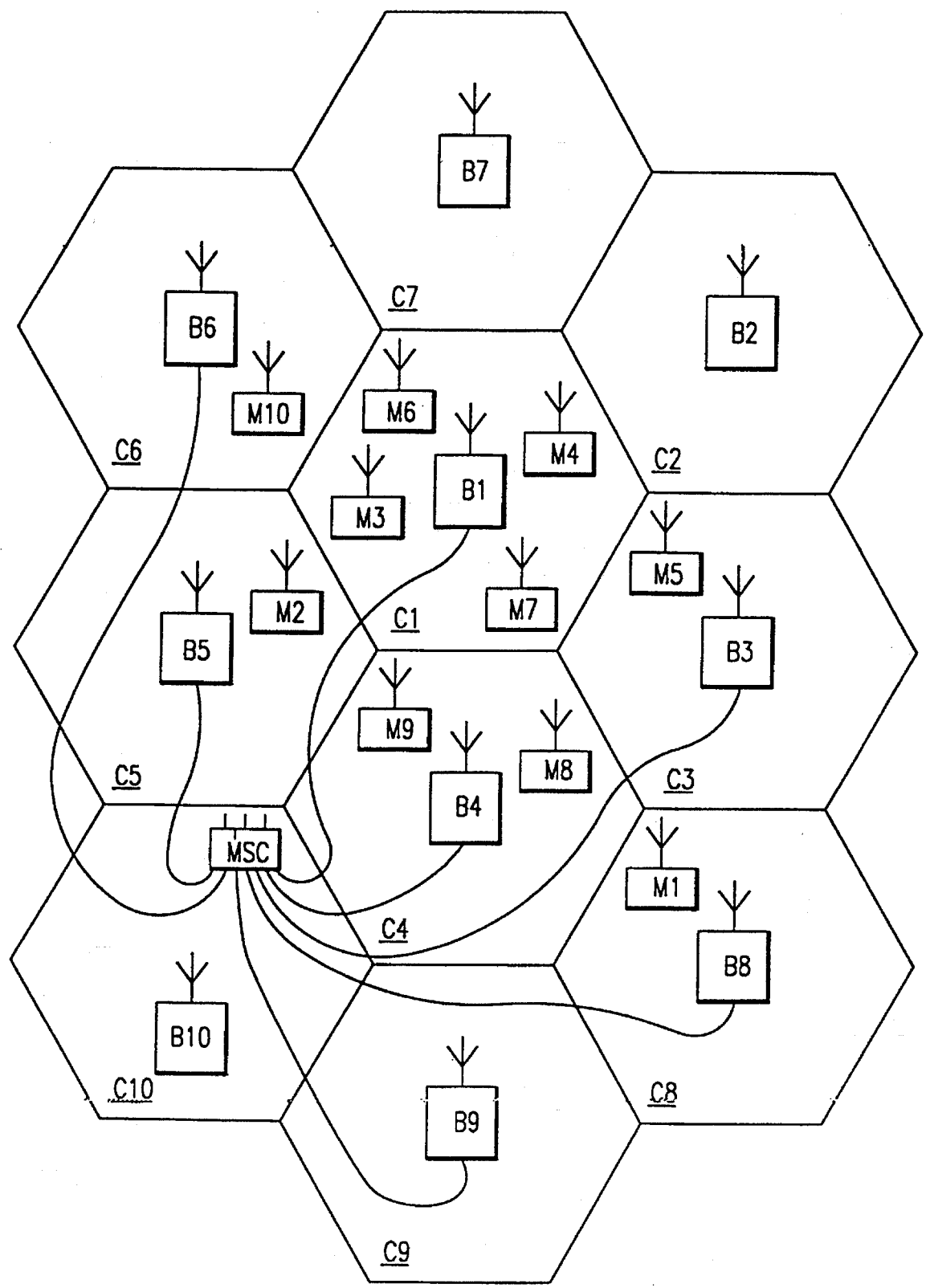
FIG. 1 is a block diagram illustrating components of a cellular radio communication system associated with the present invention.

Referring first to FIG. 1, there is illustrated a conventional cellular radio communication system of the type to which the present invention may general pertain. In FIG. 1, an arbitrary geographic area may be divided into a plurality of contiguous radio coverage areas, or cells C1–C10. While the system of FIG. 1 is illustrative shown to only include 10 cells, it should be clearly understood that in practice, the number of cells will be much larger.

Associated with and located within each of the cells C1–C10 is a base station designated as a corresponding one of a plurality of base stations B1–B10. Each of the base stations B1–B10 includes a transmitter, a receiver, and base station controller as are well known in the art. In FIG. 1, the base stations B1–B10 are illustratively located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of a mobile radio telecommunication system within which the accounting and billing system of the present invention may be implemented.

With continuing reference to FIG. 1, a plurality of mobile stations M1–M10 may be found within the cells C1–C10. Again, only 10 mobile stations are shown in FIG. 1, but it should be understood that the actual number of mobile stations will be much larger in practice and will invariably greatly exceed the number of base stations. Moreover, while none of the mobile stations M1–M10 may be found in some of the cells C1–C10, the presence or absence of the mobile stations M1–M10 and any particular one of the cells C1–C10 should be understood to depend, in practice on the individual desires of the mobile stations M1–M10 who may roam from one location in the cells to another or from one cell to adjacent cell or neighboring cell, and even from one cellular radio system served by a mobile switching center (MSC) to another such system all the while receiving and placing calls both within the cellular system as well as to and from the public switched telecommunications network (PSTN).

Each of the mobile stations M1–M10 is capable of initiating or receiving a telephone call through one or more of the base stations B1–B10 in a mobile switching center (MSC). A mobile switching center (MSC) is connected by communication links, e.g., cables, to each of the illustrative base stations B1–B10 into the fixed public switch telephone network (PSTN) (not shown) of a similar fixed network which may include an integrated services digital network (ISDN) facility. The relevant connections between the mobile switching center (MSC) and the base stations B1–B10, or between the MSC and the PSTN or ISDN, are not completely shown in FIG. 1 but are well known to those of ordinary skill in the art. Similarly, it is also known to include more than one mobile switching center in the cellular radio system and to connect each additional mobile switching center to a different group of base stations and to other mobile switching centers via cable or radio links.

Each of the cells C1–C10 is allocated a plurality of voice or speech channels and at least one access or control channel, such as a forward control channel (FOCC). The control channel is used to control or supervise the operation of the mobile station by means of information sent and received from those units, referred to as messages. Control and administration messages within a cellular radio system are sent in accordance with industry established air interface standards, such as EIA/TIA 553, the standard for analog cellular operations, and/or IS-54B, the standard for digital cellular operations, each of which are hereby incorporated by reference herein. While these standards govern North American operations, similar standards govern other geographic areas throughout the world. The information exchanged between base stations and mobile stations via messages, may include incoming call signals, outgoing call signals, paging signals, paging response signals, location registration signals, voice channel assignments, maintenance instructions, handoff instructions as the mobile station travels out of the radio coverage of one cell and into the radio coverage of another cell, as well as other additional items of information such as calling party numbers, time information, and the like employed in the system of the present invention. The control or voice channels may operate in either analog or digital mode or a combination thereof based upon well established industry standards.

Figure 2:
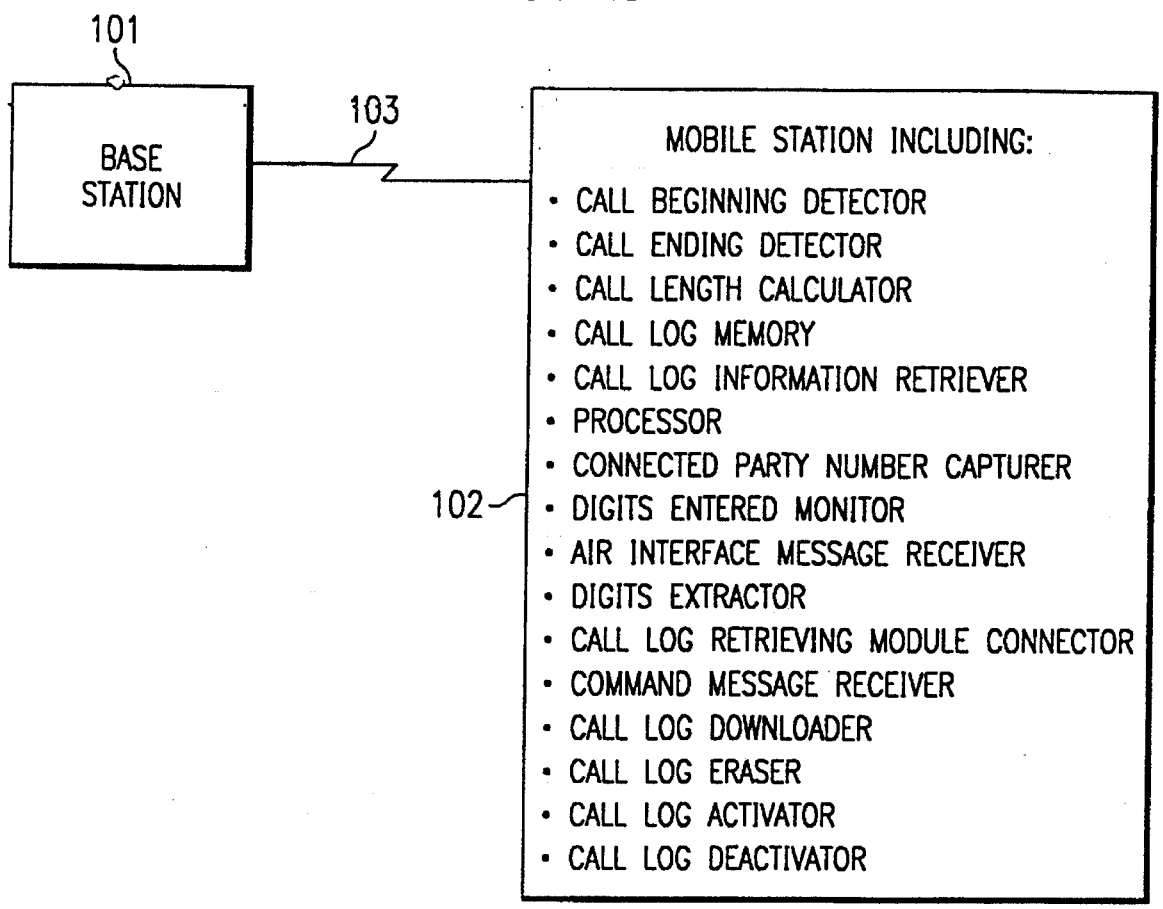
FIG. 2 is a diagram depicting the message flow and call states within a mobile subscriber station from which information is collected by the system of the present invention.

Referring next to FIG. 2, there is shown an illustrative block diagram depicting a base station 101 in radio communication with a mobile station 102 by means of a radio link over which messages 103 are exchanged. The base station 101 may be similar to any one of the base stations B1–B10 illustrated in FIG. 1, while the mobile station 102 may be similar to any one of the mobile stations M1–M10 illustrated in FIG. 1. The mobile station 102 receives and transmits messages 103 to and from the base station 101 in the course of setting up voice channels between the two so that communication can occur while the mobile station 102 is moved from one location to the other within the cellular radio network with which it is connected.

In general, a charge for a telephone call within a cellular radio telecommunication network consists of two parts, a charge for the occupancy of the radio bandwidth during the time of the call and any additional charges for a telephone call outside the normal service area of the cellular radio system within which the call is made. The charge for the occupancy of radio bandwidth is proportional to the duration of the period of that occupancy, i.e., measured in fractions of a minute, and this charge applies whether a call is made from the mobile station or received by a mobile station. The additional increment of charge for a mobile station call varies on a case by case basis and may include one or more of the following circumstances:

(a) if a call is made directly to a destination by the cellular subscriber station and that destination is outside the normal calling area of the cellular system, a charge is made based upon the destination number, the duration of the call and the time of the call;

(b) if a call is made through a long distance carrier, a call to the long distance carrier service node is charged first and then an additional charge for service of the long distance call is made by either direct billing to the mobile station or by a charge to a separate credit card account, depending upon the arrangements made with the cellular operator;

(c) if a call is made through an operator, the cost of the charge may not be known since the destination number is not available within the messages exchanged by the switching system. In the event the call is a collect call, the charge may not be known and may be even zero if accepted by the called party.

The system of the present invention does not contemplate the details of cellular radio telephone charging methods; however, by means of certain examples seeks to identify the connected party's number, the duration of the call and the time of the call as key elements of a portable cellular radio telephone charging technique.

During the process by which a call is terminated to a cellular subscriber station, it must go through a sequence comprising a plurality of different call states. The implementation of such call states, the transitions therebetween, and the terminology designating such call states may vary depending upon different manufacturers, their products and models. However, certain call subscriber station states within the particular scope of the present invention can be generalized as follows:

(a) idle state—A call is neither made nor received on the mobile radio subscriber station therefore the mobile station is available for either originating or terminating new call.

(b) seized state—The mobile radio subscriber station has communicated with the base station and has been granted the opportunity to send a message to the base station. This message can either be a page response, if a call is being terminated to the mobile station, or a call origination message if the mobile station is seeking to originate a call. A page response herein refers to a response to a page message broadcast by the base station that an incoming call has been placed to the mobile station and the mobile station is being sought for termination of that call.

(c) waiting for connection state—after either a call origination message or a response to paging message from a mobile station has been successfully sent to the base station, the mobile station is then waiting for a response from the base station. The response from the base station in the normal case can be either a connect message or an acknowledge message. When the destination party called by the mobile station answers the call, the base station will send a connect message. When the base station correctly recognizes the response to paging message, the base station will send the acknowledge message. In either case, the call moves into the conversation state.

(d) conversation state—The destination party has answered or the mobile station has answered, therefore the mobile station is in communication with the destination party. During this state, a release message, if a user so intends, can be sent to the base station to terminate the call.

(e) release state—After a terminate message from a mobile station has been successfully sent to the base station, the mobile station remains in this state. An acknowledge message from the base station will change the call state from release to idle.

The system of the present invention illustrates how and when the key elements of telephone charging are obtained and processed to provide extended capability within a mobile subscriber station. Through the examples set forth below, the present invention will be illustrated by means of some typical cases of telephone call charging including the manner in which the necessary information to implement such charging is obtained. However, the present invention is not limited to the call cases presented in the following examples.

In one method, a call log comprising a collection of information necessary to calculate the charging for a call is obtained through implementation of the present invention within a mobile subscriber station. Although this method does not supply all of the key elements of a telephone call charging system, the method substantially includes one of the key concepts of the invention, i.e., to collect and record a call log within the mobile station.

Figure 3:
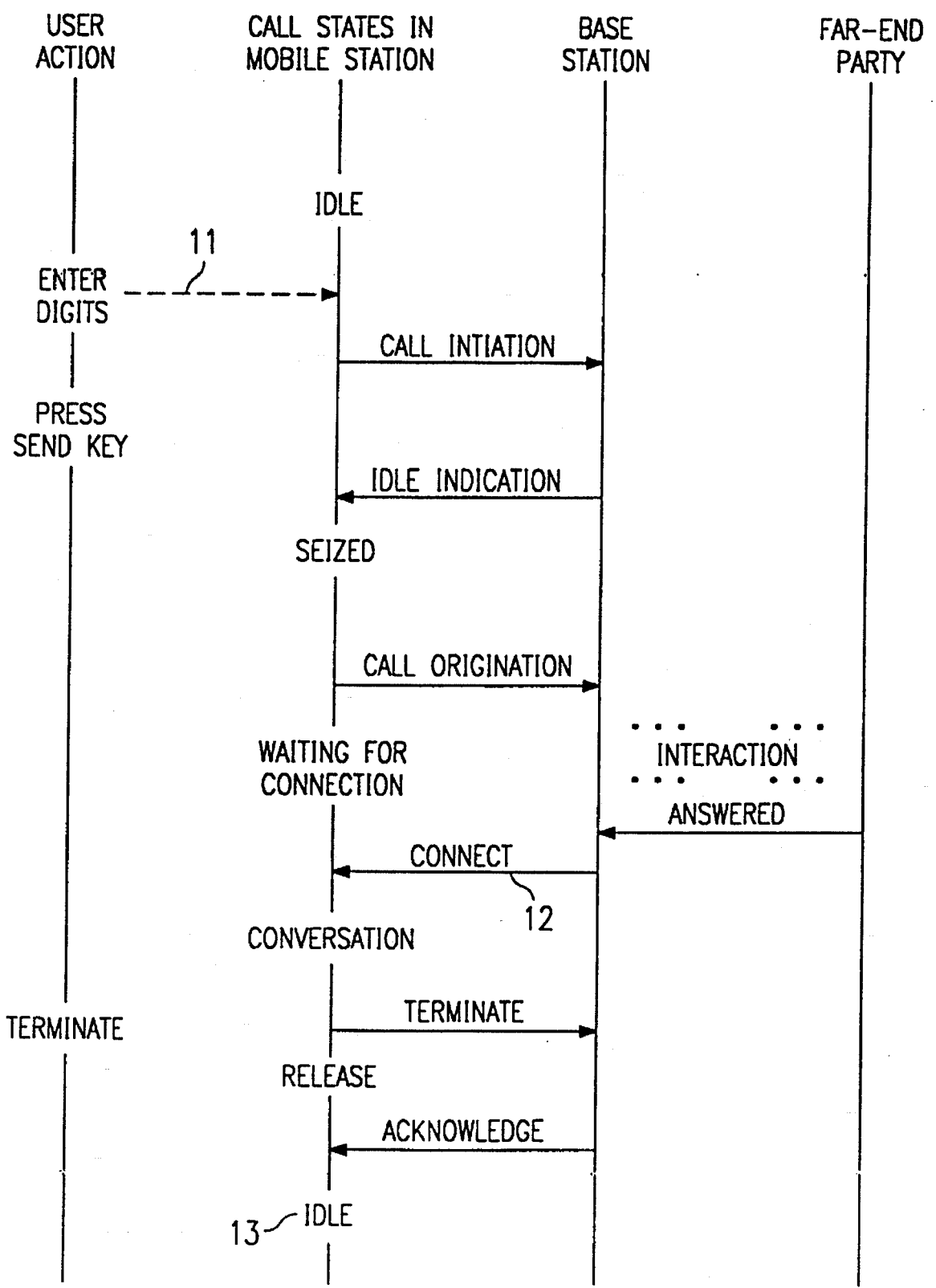
FIG. 3 is a diagram depicting the message flow and call states within a cellular subscriber station experiencing an incoming call from which information is collected by the system of the present invention.

The diagram depicted in FIG. 3, illustrates a simple outgoing call case in which a user has dialed a destination number and the mobile station interacts with the base station for the call. As depicted in FIG. 3, a destination number is captured and collected within the mobile station as indicated by item 11. The start time of the call is obtained as indicated in item 12. The internal clock of the mobile station is used to obtain the call timing information and, when a call becomes idle as indicated in item 13, the duration of the call is calculated within the mobile station by processing in accordance with the present invention. The type of call, the destination number, and the time of the call including date and duration of the call is stored in the memory of the mobile station for later processing. In the present sequence of operation, the definition of a duration of a call is not limited to the period from the conversation state to the idle state as depicted in FIG. 3. Rather, it can be flexibly defined and calculated in accordance with an algorithm which matches the charging method of the service provider such as the mobile station operator.

Figure 4:
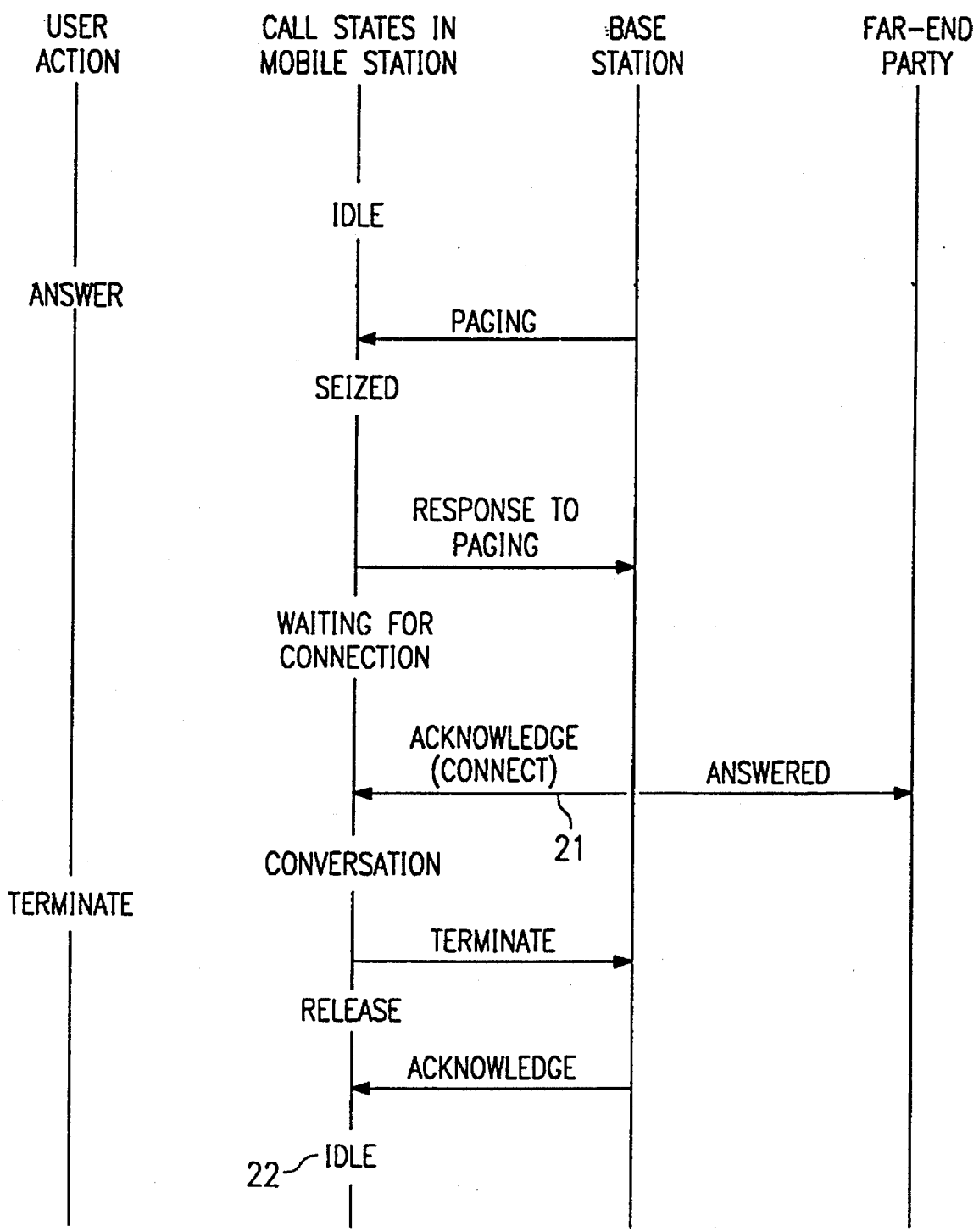
FIG. 4 is a diagram depicting the message flow and call states within a mobile station in which an operator assisted call is completed as an outgoing call from the mobile station illustrating data used by the system of the present invention.

As depicted in FIG. 4, an incoming call is similarly measured as illustrated by a simple incoming call case in which a far end party has dialed a mobile station equipped with the system of the present invention and has addressed that station. The mobile station thereafter interacts with the base station of a call upon a user answering an incoming call. As depicted in FIG. 4, the calling party's number is not available since the mobile station has not dialed the call. However, the start time of a call is obtained as indicated at item 21. The internal clock of the mobile station is used to obtain all call timing information and when a call becomes idle as indicated in item 22, the duration of the call is calculated by the mobile station's processing in accordance with the present invention. The type of call, the time of the call, including date and duration of the call, is stored in the memory of the mobile station for subsequent processing. In the present sequence of operations, the duration of a call is not limited to the period from the conversation state to the idle state as depicted in the figure. It can be flexibly defined to match the charging method with that provided by the operator of the mobile cellular radio system. In the present method, the embodiment of the invention illustrated is that of a call log which consists of the type of call, the connected party's number, the duration of the call, the time of the call, or any combination of those items which can be collected by a mobile station and stored within its memory.

In accordance with an alternative method of operation, due to the fact that the connected party's number is not available with the first method and under certain circumstances, if a call is an incoming call to the mobile station, the invention contemplates the capability of the base station supplying the connected party's number to the mobile station within the context of a message. Depending upon the implementation of the base station, the connected party's number is not stored, but rather, transmitted to the base station as part of the standard message protocol. As contemplated within EIA/TIA 553, the analog air interface message standard, such information could be included within such protocol. Similarly, in IS-54B, the calling party number functionality specified in paragraph 3.7.3.1.3.2.1.4 on page 34 of such standard contemplates that a calling party number may be transmitted by the base station to the mobile station and hence available for capture and use within the present invention. This calling party number transmission may be selected as an optional functionality within the base station to implement the charging system in accordance with the present invention for individual subscribers who need such functionality.

Figure 5:
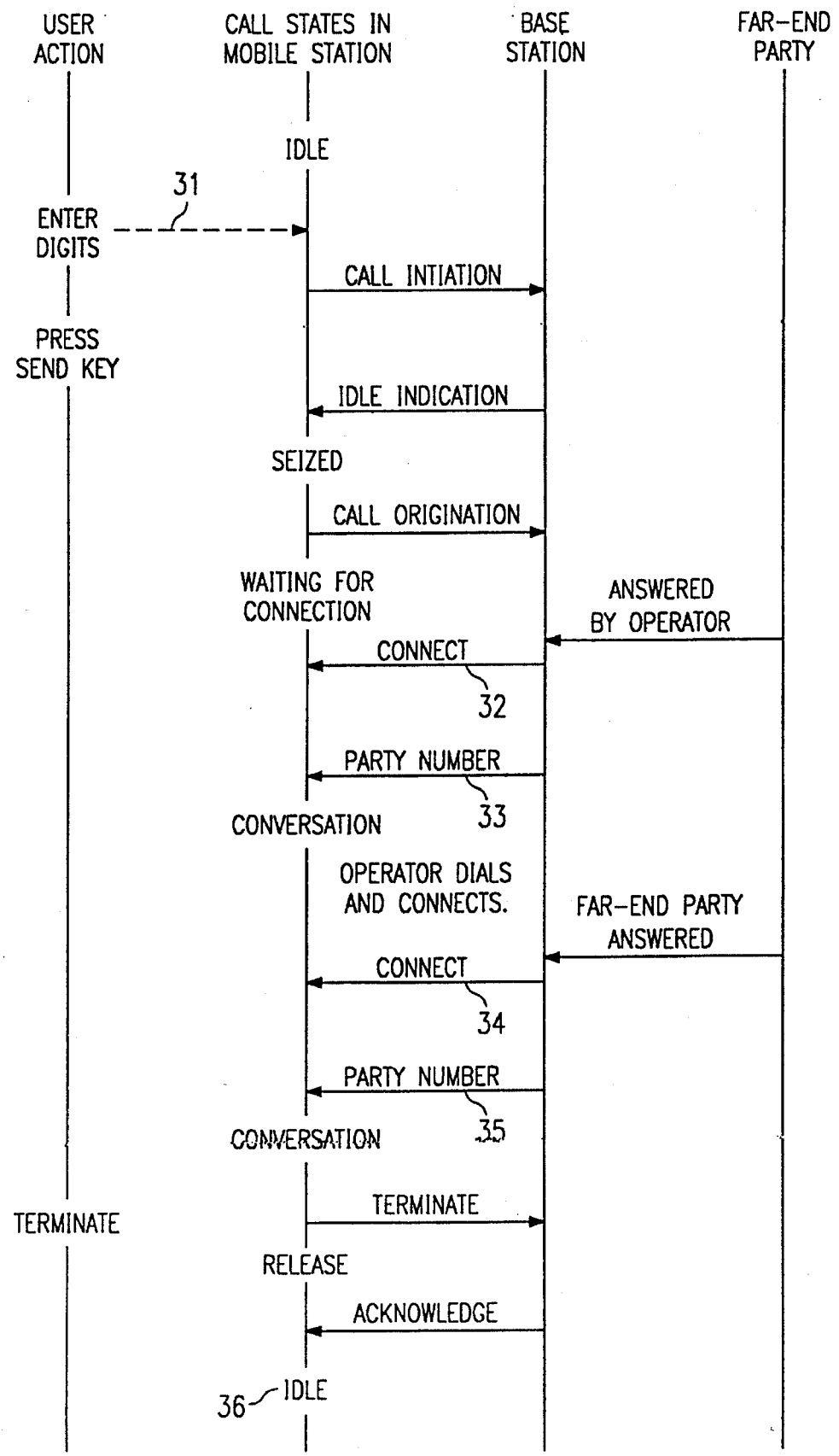
FIG. 5 is a diagram depicting the message flow and call states within a mobile station in which an operator assisted call is being completed as an incoming call from the mobile station illustrating data used by the system of the present invention.

In the case of an outgoing call, as depicted in FIG. 5, there is depicted a call case that a mobile station has dialed an operator or a long distance carrier service station and requested to dial a destination number. The operator or long distance carrier service station has then dialed the destination number and connected the call to the mobile station. In such a case, FIG. 5 shows that the mobile station, unless provided by other means such as a message from the base station, does not have the connected party's number since the third party (the operator or long distance carrier service station) has dialed the destination number for the mobile station. As depicted in the diagram of FIG. 5, the remote connected party's number can still be collected by the mobile station as indicated at item 31. The start time of the call is obtained with the mobile station as indicated in item 32. The internal clock of the mobile station is used to record the time of the call. As shown in item 33, the connected party's number can be sent to the mobile station and since the first connected party's number has been obtained within the mobile station, the information may not be mandated or may not be used. However, since the base station does not know if the user of the mobile station would request a different destination number through the conversation to personnel of the connected party, the base station may send this message to the mobile station regardless.

When the operator connects a new party to the mobile station, the connect message is sent to the mobile station as indicated with item 34. In addition, the connected party's number is sent to the mobile station as indicated in item 35. This information is used and stored in the mobile station as part of the call log.

When a call again becomes idle, as indicated at item 36, the duration of the call is then calculated. In this type of call, the connected parties' number, the time of the call and the duration of the call are stored in the memory of the mobile station for later processing in accordance with the system of the present invention. In the present sequence of operation, the definition of a duration of a call is not limited to the period from the conversation state to the idle state as depicted in the diagram. Rather, it is flexibly defined to match the charging method of the service provider provided by the operator of the cellular radio system involved.

Figure 6:
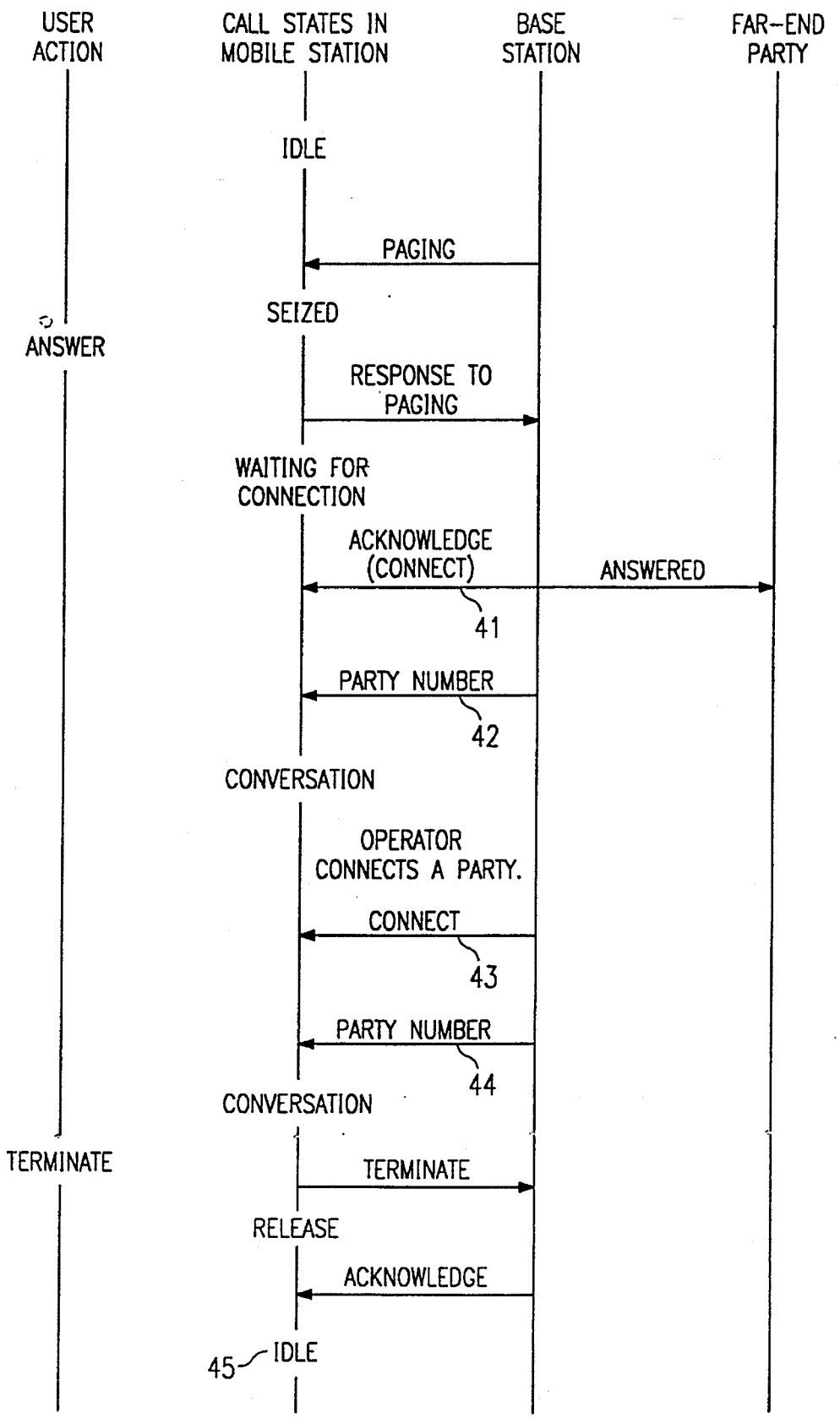
FIG. 6 is a diagram depicting the message flow and call states within a cellular radio subscriber station producing data used in the system of the present invention.

Further, with reference to the diagram of FIG. 6, an incoming call case is illustrated in which an incoming call to a mobile station has been delivered, the mobile station has answered the incoming call and the far end party was an operator who was transferring a collect call to the mobile station. As depicted in the diagram of FIG. 6, the calling party's number is not available in the early stage of the call since the mobile station has not dialed the call. However, the destination number can be supplied to the base station as indicated in item 42. The start time of the call can be obtained as indicated in item 41 and an internal clock of the mobile station is used to effect all timing matters with respect to the implementation. There is another connected party involved in the call since the first party, an operator, has transferred the call to the mobile station. The second connected party's number can then be supplied by the mobile station as indicated in item 44. When a call becomes idle as indicated in item 45, the duration of the call can be calculated by the mobile station. The type of call, the connected parties' number, the time of the call and the duration of the call is stored in the memory of the mobile station for later processing in accordance with the system of the present invention. In the present sequence of operation, the definition of a duration of a call is not limited to the period from the conversation state to the idle state as depicted in the diagram. It can be flexibly defined to match with the charging method of the service provider such as the operator of the mobile radio system within which the present system is operated.

The present invention illustrates that a call log which consists of the type of call, the connected party's number, the duration of the call, the time of call or any combination of the above can be collected by a mobile station and stored within the memory of the mobile station. The present invention also exhibits an operational mode in which the connected party's number is supplied by the base station, collected and thereafter stored in the mobile station.

Figure 7:
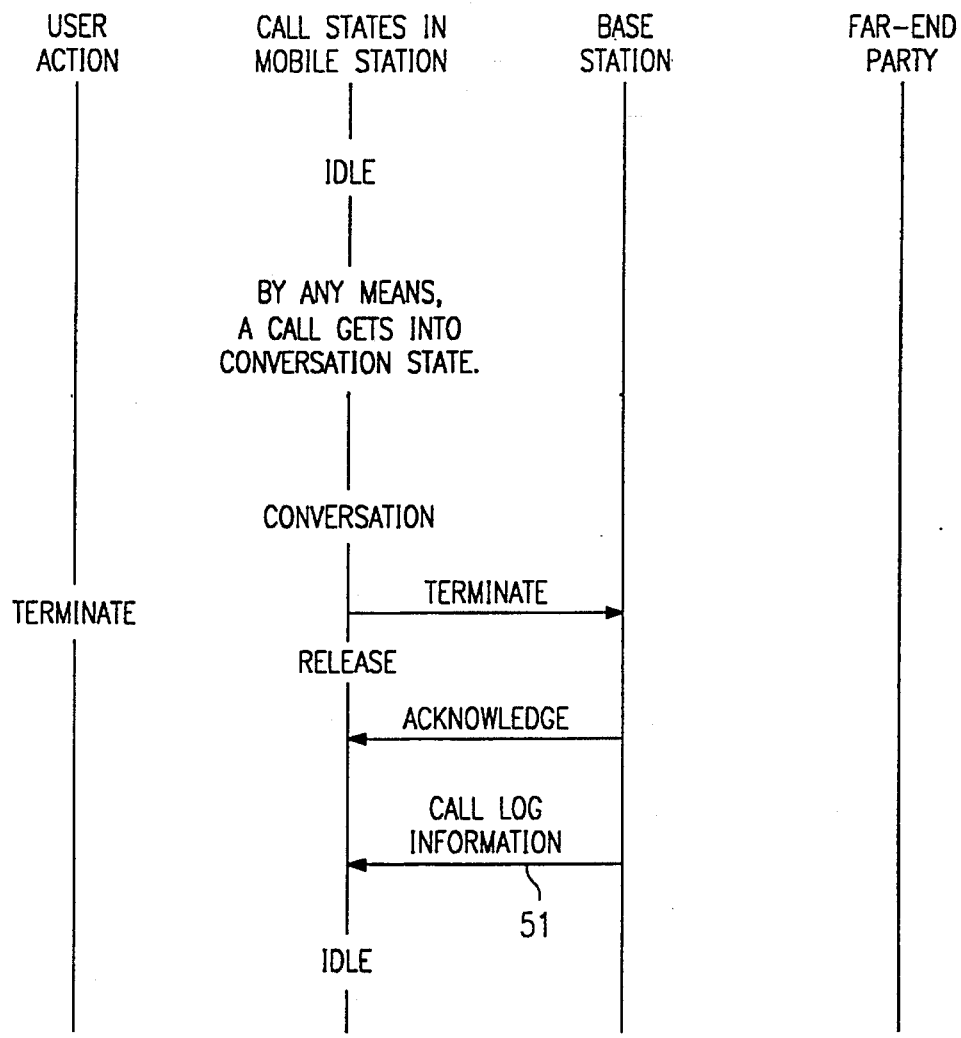
FIG. 7 is a block diagram of a cellular radio subscriber station illustrating the construction and arrangement of components in accordance with the system of the present invention.

With respect to another method of practicing the present invention, the diagram set forth in FIG. 7 illustrates that any subsequent call log information can be supplied by a base station regardless of the call cases. As depicted in FIG. 7, during a call the mobile station changes its state from idle, to conversation and back to idle again. Although the call states in the diagram of FIG. 7 do not specify all the call states that a lifecycle of a call can include, the present invention intends to cover the lifecycles of a call that include a starting state, a conversation state and a final state. The present invention includes the concept that any subset of call log information can be supplied from a base station as indicated in item 51 of FIG. 7. A subset of call information includes, but is not limited to, data such as the connected party's number, the duration of the call, the time of the call, the type of call, and means directly or indirectly translating these data into call charging. Such call log information can be supplied by a base station on a per call basis, per specified multi-call basis, periodically or any combination of the above.

With respect to the contents of a call log as contemplated within the present invention, it can consist of date/time information, type of the call, time of the call, the duration of the call, the connected party's number and a delimiter on a record. The actual format of a call log may vary in order to optimize the usage of storage space within the memory of a subscriber station. However, the following examples can be illustrated as information to be contained within the contents of the call log:

(a) date delimiter—This information indicates that a new day has started and a new date information is immediately following.

(b) date—This information immediately follows a date delimiter which stores the month and day. In this manner, this information could be stored in 2 bytes. In a less compact manner such information could be stored in up to 9 bytes.

(c) call record delimiter—This information indicates that a record of a call log has been stored and the length of the information is immediately following.

(d) length—This information immediately follows a call record delimiter and stores the length of the record of the call log. A byte can be reserved for this information, however, such a reservation can be changed depending upon the particular implementation.

(e) type of call—The type of call can be incoming or outgoing and can be represented by one bit.

(f) start time of the call—The start time of the call may be stored in 2 bytes.

(g) end time of the call—The end time of the call may be stored in 2 bytes.

(h) duration of the call—Duration of the call in terms of 4 second increments can be stored in 2 bytes.

(i) connected party's number—The full length or part of the connected party's number can be stored. More than one connected party can also be accommodated and, if a connecting party's number is not available, it will be indicated as such. A byte carries two digits of information.

A call log may be stored in non-volatile memory within the mobile station such as a random access memory (RAM) having a specific battery backup. The contents of this RAM memory will be maintained until a specific program in the processor of the mobile station erases it. The memory used to store call log information in a mobile subscriber station in accordance with the invention may include memory space already incorporated into the station for other purposes or memory added specifically for purposes of call logging. The existing processor(s) within a subscriber station may be readily programmed to perform the data collection, calculation and storage functions in order to produce the call log of the present invention.

Figure 8:
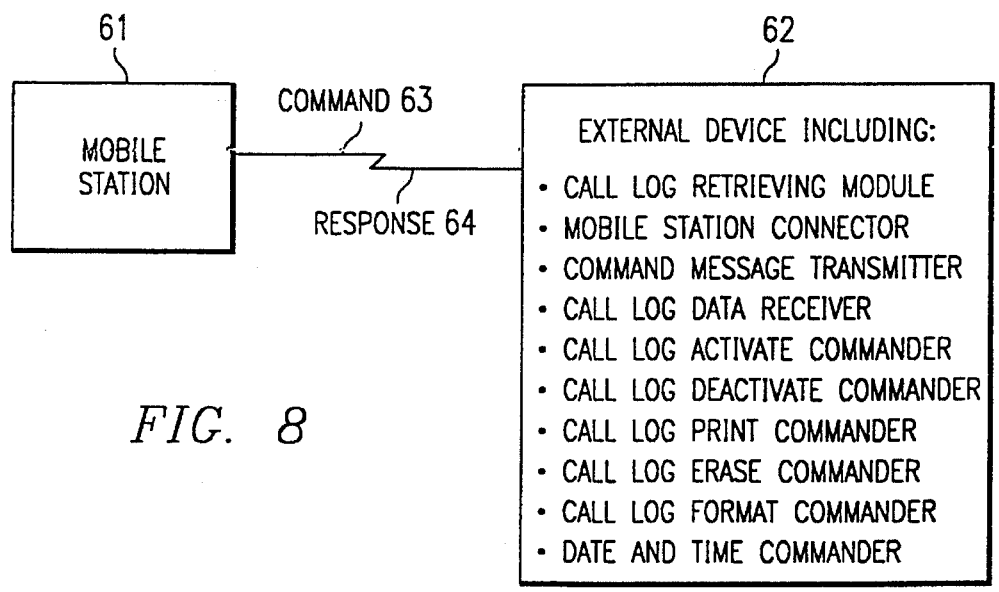
FIG. 8 is a block diagram illustrating programming and data extraction of the system of the present invention.

Referring next to FIG. 8, there is shown a block diagram illustrating that an external call log data retrieving module constructed in accordance with the present invention which may be connected directly to the mobile station. As shown, a mobile station 61 is connected to an external device 62 with a series of command messages 63 and response messages 64 to facilitate communication between the two units. An external device indicated at item 62 sends a command to a mobile station as indicated at item 61. The commands indicated in item 63 include, but are not limited to:

(a) activate call log—This is a command for an external device to start an activity of call logging in the mobile station. Upon receiving this command, the mobile station responds with an acknowledge and starts recording a call log.

(b) deactivate call log—This is a command for an external device to stop the activity of call logging in the mobile station. Upon receiving this command, the mobile station responds with an acknowledge and stops recording the call log.

(c) print call log—This is a command for an external device to request the printed call log information from the mobile station. Upon receiving this command, the mobile station responds with an acknowledge and starts transmitting the stored call log.

(d) erase call log—This is a command for an external device to request an erase of the collected call log information from the mobile station. Upon receiving this command, the mobile station responds with an acknowledge and erases the contents of the stored call log.

(e) set format of call log—This is a command for an external device to specify the length of the connected party's number to be stored in the call log of the mobile station. Upon receiving this command, the mobile station responds with an acknowledge and stores the specified number of digits in a call log.

(f) set date and time—This is a command for an external device to change the date and time information of a mobile station. This date and time information is exclusively used for call logging. Upon receiving this command, the mobile station responds with an acknowledge and stores the specific date and time.

(g) master command—This is a command for an external device to request a series of commands from a mobile station. The series of commands include: deactivate call log, print call log, wait until printing completed, erase call log and activate call log. The mobile station can send a response as indicated in item 64. This response includes, but is not limited to, an acknowledge of each of the commands and the record of the call log include the end of the call log information.

As can be seen in the aforesaid description, the system of the present invention implements the collection and use of call log information within a portable radio subscriber station in accordance with the system of the present invention. This information can greatly facilitate the billing practices with respect to the rental of such subscriber stations or many other different applications.

It is believed that the operation and construction of the present invention will be apparent from the foregoing description and, while the method and apparatus shown and described has been characterized as being preferred, obvious changes and modifications may be made therein without departing from the spirit and scope of the invention as defined in the following claims.

What is claimed is:

1. A method of producing a call log within a mobile subscriber station operating within a mobile radio system, said call log being used to collect information relating to charging for the use of said mobile subscriber station, said method comprising:

detecting the beginning and end of a call to which said mobile subscriber station is a party;

calculating the length of said call;

storing within a non-volatile memory located within said subscriber station the date and length of said call;

capturing over an air interface charging information relating to at least one party of call whenever the person in control of said mobile subscriber station is responsible for charges relating to said call, including charging information that relates to other than an outgoing call by said mobile subscriber station;

storing within said non-volatile memory said at least one captured charging information for subsequent retrieval; and subsequently retrieving said stored information and calculating a charge for the use of said subscriber station with respect to the users participation in said call, said retrieving step further comprising the steps of:

connecting said mobile subscriber station to a call log data retrieving module;

sending command messages from said call log data retrieving module to said subscriber station to extract said call log data; and downloading said call log data into said call log data retrieving module.

2. The method of producing a call log within a mobile subscriber station operating within a mobile radio system of claim 1, said call log being used to collect information relating to charging for the use of said mobile subscriber station wherein said capturing step further includes:

receiving a message on the air interface between said mobile subscriber station and a base station with which it is in communication, wherein said message contains the digits of the number of a connected party; and extracting the digits of said connected party number from said received message.

3. The method of producing a call log within a mobile subscriber station operating within a mobile radio system of claim 1, said call log being used to collect information relating to charging for the use of said mobile subscriber station wherein said capturing step further includes:

receiving standard message protocol data from a telephone operator over the air interface between said mobile subscriber station and a base station with which it is in communication, wherein said data contains the digits of the number of a connected party.

4. The method of producing a call log within a mobile subscriber station operating within a mobile radio system of claim 1, said call log being used to collect information relating to charging for the use of said mobile subscriber station wherein said step of calculating a charge further includes processing data including said start time and said end time by utilizing an algorithm that is the same as that used by the mobile system operator which completed said call to said mobile station in order to render charges from said call log consistent with those rendered by said operator.

5. The method of producing a call log within a mobile subscriber station operating within a mobile radio system of claim 1, said call log being used to collect information relating to charging for the use of said mobile subscriber station wherein said call log further includes for each call logged data stored in said memory defining a date delimiter, a date, a call record delimiter and call defining information.

6. The method of producing a call log within a mobile subscriber station operating within a mobile radio system of claim 5, said call log being used to collect information relating to charging for the use of said mobile subscriber station wherein said call defining information further includes the type of call, the length of the call and the connected parties' number.

7. The method of producing a call log within a mobile subscriber station operating within a mobile radio system of claim 1, said call log being used to collect information relating to charging for the use of said mobile subscriber station wherein said command messages sent from said call log data retrieving module to said subscriber station further include a print call log message to extract said call log data, and an erase call log message to clear the memory in said subscriber station and begin a new call log.

8. A system for producing a call log within a mobile subscriber station operating within a mobile radio system, said call log being used to collect information relating to charging for the use of said mobile subscriber station, said system comprising:

means for detecting the beginning and end of a call to which said mobile subscriber station is a party;

means for calculating the length of said call;

means for storing within a non-volatile memory located within said subscriber station the date and length of said call;

means for capturing over an air interface charging information relating to at least one party of a call whenever the person in control of said mobile subscriber station is responsible for charges relating to said call, including charging information that relates to other than an outgoing call by said mobile subscriber station;

means for storing within said non-volatile memory said at least one captured charging information for subsequent retrieval; and means for subsequently retrieving said stored information and calculating a charge for the use of said subscriber station with respect to the users participation in said call, said retrieving means further comprising:

means for connecting said mobile subscriber station to a call log data retrieving module;

means for sending command messages from said call log data retrieving module to said subscriber station to extract said call log data; and means for downloading said call log data into said call log data retrieving module.

9. The system for producing a call log within a mobile subscriber station operating within a mobile radio system of claim 8, said call log being used to collect information relating to charging for the use of said mobile subscriber station wherein said means for capturing further includes:

means for receiving a message on the air interface between said mobile subscriber station and a base station with which it is in communication, wherein said message contains the digits of the number of a connected party; and means for extracting the digits of said connected party number from said received message.

10. The system for producing a call log within a mobile subscriber station operating within a mobile radio system of claim 8, said call log being used to collect information relating to charging for the use of said mobile subscriber station wherein said means for capturing further includes:

means for receiving standard message protocol data from a telephone operator over the air interface between said mobile subscriber station and a base station with which it is in communication, wherein said data contains the digits of the number of a connected party.

11. The system for producing a call log within a mobile subscriber station operating within a mobile radio system of claim 8, said call log being used to collect information relating to charging for the use of said mobile subscriber station wherein said means for calculating a charge further includes means for processing data including said start time and said end time by utilizing an algorithm that is the same as that used by the mobile system operator which completed said call to said mobile station in order to render charges from said call log consistent with those rendered by said operator.

12. The system for producing a call log within a mobile subscriber station operating within a mobile radio system of claim 8, said call log being used to collect information relating to charging for the use of said mobile subscriber station wherein said call log further includes for each call logged data stored in said memory defining a date delimiter, a date, a call record delimiter and call defining information.

13. The system for producing a call log within a mobile subscriber station operating within a mobile radio system of claim 12, said call log being used to collect information relating to charging for the use of said mobile subscriber station wherein said call defining information further includes the type of call, the length of the call and the connected parties' number.

14. The system for producing a call log within a mobile subscriber station operating within a mobile radio system of claim 8, said call log being used to collect information relating to charging for the use of said mobile subscriber station wherein said command messages sent from said call log data retrieving module to said subscriber station further include a print call log message to extract said call log data, and an erase call log message to clear the memory in said subscriber station and begin a new call log.

* * * * *